US010189725B2

United States Patent
Landis et al.

(10) Patent No.: US 10,189,725 B2
(45) Date of Patent: Jan. 29, 2019

(54) METHODS OF SEPARATING IMPURITIES FROM INDUSTRIAL MINERALS USING ELECTROCOAGULATION

(71) Applicants: Halliburton Energy Services, Inc., Houston, TX (US); Water Tectonics, Inc., Everett, WA (US)

(72) Inventors: Charles Landis, The Woodlands, TX (US); Shantel J Stone, Conroe, TX (US); Bryan Nielsen, Edmonds, WA (US)

(*) Notice: Subject to any disclaimer, the term of this patent is extended or adjusted under 35 U.S.C. 154(b) by 115 days.

(21) Appl. No.: 14/910,594

(22) PCT Filed: Oct. 13, 2014

(86) PCT No.: PCT/US2014/060279
§ 371 (c)(1),
(2) Date: Feb. 5, 2016

(87) PCT Pub. No.: WO2015/057575
PCT Pub. Date: Apr. 23, 2015

(65) Prior Publication Data
US 2016/0194223 A1 Jul. 7, 2016

Related U.S. Application Data

(60) Provisional application No. 61/890,995, filed on Oct. 15, 2013.

(51) Int. Cl.
*C02F 1/46* (2006.01)
*C02F 1/463* (2006.01)
(Continued)

(52) U.S. Cl.
CPC .......... *C02F 1/463* (2013.01); *C02F 1/46104* (2013.01); *C02F 1/52* (2013.01);
(Continued)

(58) Field of Classification Search
None
See application file for complete search history.

(56) References Cited

U.S. PATENT DOCUMENTS

| 4,219,408 A | 8/1980 | Price et al. |
| 8,658,014 B2 * | 2/2014 | Bjornen ................. C02F 1/463 |
| | | 204/554 |

(Continued)

FOREIGN PATENT DOCUMENTS

| WO | 2009150646 A2 | 12/2009 |
| WO | WO-2015057575 A1 | 4/2015 |

OTHER PUBLICATIONS

"International Application Serial No. PCT/US2014/060279, International Search Report dated Jan. 30, 2015", 3 pgs.
"International Application Serial No. PCT/US2014/060279, Written Opinion dated Jan. 30, 2015", 12 pgs.
"Purification of Kaolin Clays by Means of Electrochemical Techniques", Recent Developments in Metallurgy, Material and Environment, Chapter 14, (2012), 145-154.

*Primary Examiner* — Arun S Phasge
(74) *Attorney, Agent, or Firm* — Chamberlain Hrdlicka

(57) ABSTRACT

Various embodiments disclosed relate to methods of separating impurities from industrial minerals using electrocoagulation and apparatuses for performing the same. In one embodiment, the present invention provides a method of purifying an industrial mineral composition. The method can include obtaining or providing an aqueous slurry comprising a mineral composition comprising one or more industrial minerals and one or more impurities. The method can include subjecting the aqueous slurry to an electrical current to form at least one coagulation comprising the one or more impurities. The method can include separating at least one of the coagulations from the one or more minerals, providing a purified mineral composition.

19 Claims, 1 Drawing Sheet

(51) Int. Cl.
*C09C 1/00* (2006.01)
*C02F 1/461* (2006.01)
*C02F 1/52* (2006.01)
*C02F 103/10* (2006.01)
*B01D 21/00* (2006.01)
*C02F 101/10* (2006.01)
*C02F 101/20* (2006.01)
*C02F 101/22* (2006.01)

(52) U.S. Cl.
CPC ............ *C09C 1/00* (2013.01); *B01D 21/0009* (2013.01); *C02F 2001/46133* (2013.01); *C02F 2001/46157* (2013.01); *C02F 2001/46171* (2013.01); *C02F 2101/10* (2013.01); *C02F 2101/20* (2013.01); *C02F 2101/203* (2013.01); *C02F 2101/206* (2013.01); *C02F 2101/22* (2013.01); *C02F 2103/10* (2013.01); *C02F 2201/46105* (2013.01); *Y02P 10/238* (2015.11)

(56) References Cited

U.S. PATENT DOCUMENTS

| | | | |
|---|---|---|---|
| 8,845,906 B2* | 9/2014 | Henley | C02F 9/00 204/267 |
| 2006/0108273 A1* | 5/2006 | Perri | B01D 21/0009 210/275 |
| 2006/0163160 A1 | 7/2006 | Weiner et al. | |
| 2008/0223731 A1 | 9/2008 | Lee | |
| 2010/0140107 A1 | 6/2010 | Sloan | |
| 2010/0187130 A1 | 7/2010 | Smith et al. | |
| 2011/0192730 A1 | 8/2011 | Bjornen | |
| 2012/0181014 A1 | 7/2012 | Daussin et al. | |
| 2012/0255872 A1 | 10/2012 | Smith et al. | |

\* cited by examiner

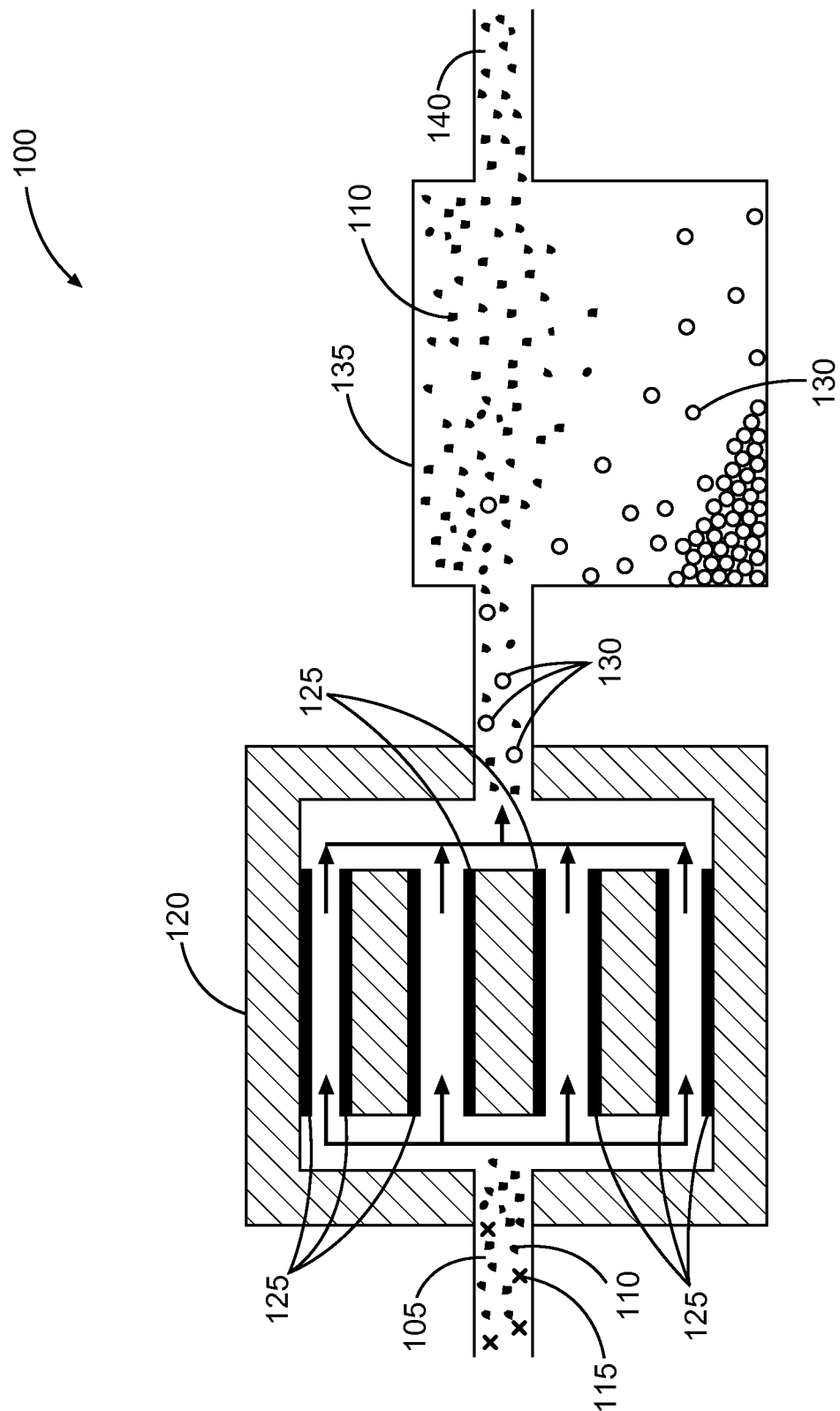

METHODS OF SEPARATING IMPURITIES FROM INDUSTRIAL MINERALS USING ELECTROCOAGULATION

RELATED APPLICATIONS

This application is a U.S. National Stage Filing under 35 U.S.C. 371 from International Application No. PCT/US2014/060279, filed on Oct. 13, 2014, and published as WO 2015/057575 A1 on Apr. 23, 2015, which claims the priority benefit of U.S. Provisional Application No. 61/890,995, filed Oct. 15, 2013 which applications and publication are incorporated herein by reference in their entirety.

BACKGROUND OF THE INVENTION

Industrial minerals are geological materials which are mined for their commercial value, are not fuel (e.g., fuel minerals or mineral fuels), and are not used as sources of metals (e.g., metallic minerals or precious metals). They can be used in their natural state or after beneficiation either as raw materials or as additives in a wide range of applications, including, for example, construction, ceramics, paints, electronics, filtration, plastics, glass, and paper. Impurities in industrial minerals can lower their value. For example, some metal oxides can impart a tint or color to the industrial mineral that disqualifies it for commercial development. Metals and metal oxides are common contaminants of mineral ores. Although considerable progress has been made to increase the recovery of the industrial mineral at the expense of higher contaminant concentration, there has been no confirmed success at selective removal of contaminants such as metals and metal oxides from industrial minerals.

BRIEF DESCRIPTION OF THE FIGURES

The drawings illustrate generally, by way of example, but not by way of limitation, various embodiments discussed in the present document.

FIG. 1 illustrates a system or apparatus including an electrocoagulator configured to subject an aqueous slurry including an industrial mineral to an electrical current, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit and can include copolymers.

The term "copolymer" as used herein refers to a polymer that includes at least two different monomers. A copolymer can include any suitable number of monomers.

As used herein, the term "fluid" refers to liquids and gels, unless otherwise indicated.

In various embodiments, the present invention provides a method of purifying an industrial mineral composition. The method includes obtaining or providing an aqueous slurry that includes a mineral composition. The mineral composition includes one or more industrial minerals. The mineral composition also includes one or more impurities. The method includes subjecting the aqueous slurry to an electrical current to form at least one coagulation including the one or more impurities. The method also includes separating at least one of the coagulations from the one or more minerals, providing a purified mineral composition.

In various embodiments, the present invention provides a method of purifying an industrial mineral composition. The method includes obtaining or providing an aqueous slurry including a mineral composition that includes one or more industrial minerals and also one or more impurities. The one or more industrial minerals include at least one of limestone, clay, sand, gravel, diatomite, kaolin, bentonite, silica, barite, gypsum, chromite, calcium carbonate, rutile, anatase, and talc. The one or more impurities include at least one of cadmium, lead, arsenic, mercury, iridium, osmium, palladium, platinum, rhodium, ruthenium, chromium, molybdenum, nickel, vanadium, copper, silver, gold, tin, arsenic, antimony, selenium, zinc, iron, zirconium, niobium, iridium, bismuth, gallium, germanium, indium, uranium, manganese, an ion thereof, a radical thereof, an oxide thereof, and a compound thereof. The method includes subjecting the aqueous slurry to an electrical current to form at least one coagulation including the one or more impurities. The method also includes separating at least one of the coagulations from the one or more minerals including allowing one of at least one coagulation or at least some of the one or more minerals to settle away from one another, providing a purified mineral composition.

In various embodiments, the present invention provides a system. The system includes an aqueous slurry including a mineral composition. The mineral composition includes one or more minerals and one or more impurities. The system includes an electrocoagulator configured to subject the aqueous slurry to an electrical current to form at least one coagulation including the one or more impurities. The system also includes a settling tank configured to settle at least one coagulation or at least some of the one or more minerals away from one another, to provide a purified mineral composition.

In various embodiments, the present invention provides an apparatus for purifying industrial minerals. The apparatus includes an electrocoagulator. The electrocoagulator is configured to subject an aqueous slurry to an electrical current. The aqueous slurry includes a mineral composition that includes one or more industrial minerals and one or more impurities. The electrical current forms at least one coagulation including the one or more impurities. The apparatus also includes a settling tank configured to settle at least one coagulation or at least some of the one or more minerals away from one another, to provide a purified mineral composition.

In various embodiments, the present method can provide certain advantages over other methods of purifying industrial minerals and mineral ores, at least some of which are unexpected. For example, in some embodiments, the electrocoagulation method can provide better separation of certain impurities from minerals or mineral ores than other methods, such as metals or metal oxides. In some embodiments, the electrocoagulation method can provide a greater amount of higher purity minerals from a given volume of mineral ore. In some embodiments, the electrocoagulation method can increase the amount of mineral with suitable commercial purity that can be produced from a given volume of mineral ore. In some embodiments, the electrocoagulation method can allow utilization and recovery of minerals from ores and ore deposits that cannot be used to generate minerals of suitable commercial purity using other methods.

In some embodiments, in producing a given amount of commercially pure mineral, the electrocoagulation method can produce a lower amount of waste than other methods. In some embodiments, the electrocoagulation method can provide separation of impurities that is at least one of easier, faster, and cheaper than other methods. In some embodiments, the electrocoagulation method can produce no sludge or can produce less sludge as compared to other methods of extracting minerals, such as chemical coagulant and chemical flocculant methods.

Method of Purifying an Industrial Mineral Composition

In various embodiments, the present invention provides a method of purifying an industrial mineral composition. The method can include obtaining or providing an aqueous slurry that includes a mineral composition. The mineral composition includes one or more industrial minerals and one or more impurities.

The method includes subjecting the aqueous slurry to an electrical current to form at least one coagulation including the one or more impurities. The electrical current can be any suitable electrical current that directly or indirectly causes the formation of at least one coagulation of the one or more impurities or any suitable materials that include the one or more impurities. The electrical current can pass through each portion of the aqueous composition, or the electrical current can pass through only some portions of the aqueous slurry, such as about 1 vol % of the aqueous slurry, 2 vol %, 3, 4, 5, 10, 20, 30, 40, 50, 60, 70, 80, 90, 95, 96, 97, 98, 99, 99.9, 99.99, or about 99.999 vol % of the aqueous slurry. The electrical current that passes through one portion of the aqueous slurry can be the same or different duration or intensity as compared to the electrical current that passes through another portion of the aqueous slurry. The electrical current can be any suitable number of amps, and can, for example, be about 0.000,001 amps to about 1,000,000 amps, about 0.001 amps to about 100,000 amps, or about 0.000, 001 amps or less, or about 0.000,01 amps, 0.000,1, 0.001, 0.01, 0.05, 0.1, 0.5, 1, 2, 3, 4, 5, 6, 7, 8, 9, 10, 15, 20, 25, 50, 75, 100, 150, 200, 300, 400, 500, 750, 1,000, 1,500, 2,500, 5,000, 7,500, 10,000, 15,000, 25,000, 50,000, 75,000, 100,000, 500,000, or about 1,000,000 amps or more. The current can have any suitable density, such as about 0.000, 000,01 amps/cm$^2$ to about 10,000 amps/cm$^2$, about 0.000, 001 amps/cm$^2$ to about 1,000 amps/cm$^2$, or about 0.000, 000,01 amps/cm$^2$ or less, or about 0.000,000,1 amps/cm$^2$, 0.000,001, 0.000,01, 0.000,1, 0.000,5, 0.001, 0.005, 0.01, 0.05, 0.1, 1, 5, 10, 15, 20, 25, 50, 75, 100, 150, 200, 250, 500, 750, 1,000, 1,500, 2,500, 5,000, 7,500, or about 10,000 amps/cm$^2$ or more. The amount of current and the duration of exposure of any given portion of the aqueous slurry to the current can be such that any suitable amps per time per volume of the aqueous slurry is used, such as about 0.000, 000,000,01 amps/min per cm$^3$ of aqueous slurry to about 1,000,000 amps/min per cm$^3$ of aqueous slurry, about 0.000, 000,001 amps/min per cm$^3$ of aqueous slurry to about 10,000 amps/min per cm$^3$ of aqueous slurry, or about 0.000, 000,000,01 amps/min per cm$^3$ of aqueous slurry or less, or about 0.000,000,000,1 amps/min per cm$^3$, 0.000,000,001, 0.000,000,01, 0.000,000,1, 0.000,001, 0.000,01, 0.000,1, 0.001, 0.01, 0.1, 1, 5, 10, 15, 20, 25, 50, 75, 100, 150, 200, 250, 500, 750, 1,000, 1,500, 2,500, 5,000, 10,000, 15,000, 25,000, 50,000, 100,000, 250,000, 500,000, or about 1,000, 000 amps/min per cm$^3$ of aqueous slurry or more. The current can be a direct current or an alternating current having any suitable frequency.

The electrical current can be generated in any suitable way. For example, the electrical current can be generated within an electrocoagulation unit that includes one or more pairs of electrodes (e.g., anode cathode pairs) for generation of the electrical current in the aqueous slurry. The method can include passing the aqueous slurry through one or more electrocoagulation units. The slurry can flow through the electrocoagulation unit in a straight path, can weave back and forth, or can take any suitable path through the electrocoagulation unit, so long as at least part of the aqueous slurry is exposed to an electrical current sufficient to directly or indirectly cause one or more coagulations form during or after the exposure to the electrical current. The flow of the aqueous slurry through the electrocoagulation unit can occur in a continuous or a batchwise manner. A continuously flowing aqueous slurry can have any suitable flow rate through the electrocoagulation unit, such as about 0.1 gallons per minute to about 10,000,000 gallons per minute, or about 0.1 gal/min, 1, 2, 5, 10, 15, 20, 25, 50, 75, 100, 150, 200, 250, 500, 750, 1,000, 1,500, 2,500, 5,000, 10,000, 15,000, 25,000, 50,000, 100,000, 250,000, 500,000, 1,000,000, 5,000,000, or about 10,000,000 gal/min. In a continuous or batchwise flow, the aqueous slurry can have any suitable residence time in the electrocoagulation unit, such that one or more coagulations form during or after the exposure to electrical current within the electrocoagulator. In some embodiments, multiple electrocoagulation units can each be designed to target one or more specific impurities. Several electrocoagulators can be used that target the same impurity, and different electrocoagulators can be used that target different impurities. After the aqueous slurry has flowed through a particular electrocoagulator, the aqueous slurry can pass on to a separation stage, can pass on to another electrocoagulator, can pass through the same electrocoagulator again, or can pass on to another stage. In various embodiments, any suitable one or more purification techniques can be used before or after an electrocoagulation unit, such as centrifugation, settling tanks, dissolved air flow flotation, any type of particle separator, microfiltration, sieves, ultrafiltration, or microfiltration.

The current generated between a particular pair of electrodes can have any suitable density on the surface of the particular pair of electrodes. For example, the current density can be about 0.000,000,01 amps/cm$^2$ to about 10,000 amps/cm$^2$, about 0.000,001 amps/cm$^2$ to about 1,000 amps/cm$^2$, or about 0.000,000,01 amps/cm$^2$ or less, or about 0.000,000,1 amps/cm$^2$, 0.000,001, 0.000,01, 0.000,1, 0.000, 5, 0.001, 0.005, 0.01, 0.05, 0.1, 1, 5, 10, 15, 20, 25, 50, 75, 100, 150, 200, 250, 500, 750, 1,000, 1,500, 2,500, 5,000, 7,500, or about 10,000 amps/cm$^2$ or more. The voltage between any one particular pair of electrodes can be any suitable voltage such that a suitable current, as described herein, is generated. For example, the voltage can be about 0.000,001 volts to about 10,000,000 volts, about 0.000,1 volts to about 100,000 volts, or about 0.000,000,1 volts or less, or about 0.000,001, 0.000,01, 0.000,1, 0.001, 0.01, 0.1, 1, 5, 10, 15, 20, 25, 50, 75, 100, 150, 200, 250, 500, 750, 1,000, 1,500, 2,500, 5,000, 10,000, 15,000, 25,000, 50,000, 100,000, 250,000, 500,000, 1,000,000, 5,000,000, or about 10,000,000 volts or more.

The electrodes can have any suitable shape. For example, the electrodes can independently have the shape of at least one of a plate, sphere, cylinder, and tube. In some embodiments, the electrodes are plates. One or more of the electrodes can be perforated, such as a perforated plate or perforated tube. The electrodes can be made of any suitable material. For example, each of the electrodes in a particular pair of electrodes (e.g., anode and cathode) can independently include at least one of iron, aluminum, steel, graphite, copper, molybdenum, and titanium. In some embodiments, for an anode/cathode pair, at least one electrode, or at least part of at least one electrode, can be a sacrificial electrode, designed to react and help to reduce or prevent reaction or passivation of the other electrode. The distance between a particular pair of electrodes can be any suitable distance, such that the aqueous slurry can flow between the electrodes and such that a suitable current is generated in the aqueous slurry between the electrodes. For example, the distance between a pair of electrodes (e.g., anode and cathode) can be about 0.1 cm to about 100 cm, about 1 cm to about 10 cm, or about 0.1 cm or less, or about 0.5 cm, 1, 2, 3, 4, 5, 6, 7, 8, 9, 10, 15, 20, 25, 30, 35, 40, 45, 50, 55, 60, 65, 70, 75, 80, 85, 90, 95, or about 100 cm or more.

The mineral composition can include any suitable particle size (e.g., the largest dimension of a particle), average particle size, or combination of particle sizes, such as any suitable distribution of particle sizes that result from pulverization of industrial mineral ore used to generate the mineral composition. For example, the particle size can be about 0.000,001 mm to about 50 cm, or about 0.001 mm to about 10 cm, or less than about 0.001 mm to about 10 cm, or about 0.000,001 mm, 0.000,01 mm, 0.000,1 mm, 0.001 mm, 0.01 mm, 0.1 mm, 1 mm, 1 cm, 10 cm, or about 50 cm or more.

The method can include adding the mineral composition to an aqueous solution to form the aqueous slurry. The addition can take place in any suitable manner, such that an aqueous slurry is generated that can be purified as described herein. The aqueous solution in the aqueous slurry can be any suitable aqueous solution, such as at least one of water, brine, seawater, brackish water, flowback water, and produced water.

The method includes separating at least one coagulation from the one or more minerals, providing a purified mineral composition. The separating can occur in any suitable manner. The formation of the one or more coagulations including the one or more impurities can allow the separation, such as via settling below or floating above, of one or more of the coagulations from the one or more industrial minerals, with subsequent removal of either or both of the one or more settled or floated coagulations and the minerals. The removal can occur in any suitable fashion. The method can include, after subjecting the aqueous slurry to the electrical current, placing the aqueous slurry in a settling area, such as in a settling tank, wherein settling of the one or more minerals or of the one or more coagulations can occur, such as following Stoke's law. The removal can occur via allowing settling to occur and then flowing an unsettled portion out of a settling tank, such as flowing out at least part of the one or more minerals or at least part of the one or more coagulations, while at least part of the other stays behind. The removal can occur via skimming at least part of the one or more minerals or at least part of the one or more coagulations from above the other, such as from the surface (e.g., floatation capture). The removal can occur via removal of settled minerals or coagulations from the settling tank, such as from an outlet at the bottom of the tank.

The separating of at least one of the coagulations from the one or more minerals can provide a separated one or more coagulations that include any suitable proportion of the one or more impurities that were in the mineral composition. For example, the separated coagulations can include about 0.001 wt % to about 100 wt % of the one or more impurities from the mineral composition, about 50 wt % to about 100 wt %, about 60 wt % to about 100 wt %, about 70 wt % to about 100 wt %, about 80 wt % to about 100 wt %, about 90 wt % to about 100 wt %, or about 0.001 wt % or less, or about 0.01 wt %, 0.1, 1, 2, 3, 4, 5, 10, 15, 20, 25, 30, 35, 40, 45, 50, 55, 60, 62, 64, 66, 68, 70, 72, 74, 76, 78, 80, 82, 84, 86, 87, 88, 89, 90, 91, 92, 93, 94, 95, 96, 97, 98, 99, 99.5, 99.9, 99.99, 99.999, or about 99.999,9 wt % or more.

Coagulation

The method includes subjecting the aqueous slurry to an electrical current to form at least one coagulation including the one or more impurities. The formation of the one or more coagulations allows the impurities to be separated from the one or more minerals. A coagulation is an agglomeration of coagulated material, and can be solely composed of the one or more impurities or can include any suitable materials that include the one or more impurities. A coagulation can have any suitable size and shape. A coagulation can include a single impurity, or multiple impurities. A coagulation can include a floc (e.g., formed by flocculation, an agglomeration of suspended material), a precipitate (e.g., material that has come out of solution), or a combination thereof of at least one of the one or more impurities (e.g., one or more impurities, neat or combined with other materials), one or more salts of the one or more impurities (e.g., a combination of a suitable counterion with an impurity (if the impurity is an ion) or with an ion of the impurity), and one or more compounds including the one or more impurities (e.g., a compound formed by chemical reaction of the impurity with another species, such as with a compound, ion, or radical).

In various embodiments, the aqueous slurry can include one or more coagulants. The coagulant can help to produce the one or more coagulations. The coagulant can be added to the aqueous slurry, or can be generated, such as generated by electrolytic reactions occurring at one or more of the electrodes as the current is generated in the aqueous slurry. The coagulant can be any suitable compound that can help to form one or more coagulations. In some examples, the coagulant can at least one of a) absorb or adsorb the one or more impurities in the form of the one or more impurities, a salt of the one or more impurities, and a compound including the one or more impurities; b) form a salt with the one or more impurities; and c) form a compound including the one or more impurities. In some embodiments, the impurity or an ion thereof can combine with a coagulant such as $Al^{3+}$, $Fe^{2+}$, $Fe^{3+}$, and $^-OH$ to form the impurity salt, or the impurity or an ion thereof can combine with or react with a coagulant such as $O_2^-$ (superoxide) or .OH to form the compound including the impurity. The ions $Al^{3+}$, $Fe^{2+}$, $Fe^{3+}$, $HO^-$, and $O_2^-$, or the radical .OH, can be coagulants that are added to the aqueous slurry (e.g., via addition of solution salts including the ion) or generated therein, such as via electrolytic reactions of the electrodes. For example, an aluminum electrode such as an anode can generate $Al^{3+}$, and an iron electrode such as an anode can generate at least one of $Fe^{2+}$ and $Fe^{3+}$. In some embodiments, an electrode such as a cathode can generate at least one of $^-OH$, .OH, and $O_2^-$ via electrolysis of water. In some embodiments, $^-OH$ and at least one of $Al^{3+}$, $Fe^{2+}$, $Fe^{3+}$, wherein the ions are added (e.g., as a suitable salt) or generated by the electrodes, can combine to form a coagulant compound that absorbs or adsorbs the one or more impurities in a coagulation. For example, the adsorptive or absorptive compound can include at least one of $Fe(OH)_3$, $Fe(OH)_2$, and $Al(OH)_3$.

Mineral Composition

The mineral composition in the aqueous slurry can have any suitable form. The mineral composition can be derived in any suitable way, such as by pulverizing a material such as an industrial mineral ore, e.g., grinding, crushing pounding, powdering, or milling. In some embodiments, the method can include pulverizing a material to generate the mineral composition, such as pulverizing an industrial mineral ore.

The mineral composition including one or more minerals and including one or more impurities that are separated using embodiments of the method, apparatus, or system, can be any suitable mineral composition including any suitable industrial mineral. In some embodiments, the mineral composition can include, and the one or more minerals can be, at least one of an aggregate (e.g., coarse particulate material used in construction, such as sand, gravel, crushed stone, slag, recycled concrete and geosynthetic aggregates), alunite (e.g., a sulfate mineral having the formula $KAl_3(SO_4)_2(OH)_6$), asbestos (e.g., silicate mineral such as serpentine, chrysotile, amphibole, amosite, crocidolite, tremolite, actinolite, or anthophyllite), barite (e.g., barium sulfate, $BaSO_4$), bentonite (e.g., an absorbent aluminium phyllosilicate, essentially impure clay including mostly of montmorillonite), borate (e.g., including boron-containing oxyanions, such as $BO_3^{3-}$, $B_2O_5^{4-}$, $B_3O_7^{5-}$, or $B_4O_9^{6-}$), carbonatite (e.g., intrusive or extrusive igneous rocks including greater than 50 wt % carbonate minerals), chromite (e.g., chrome sands, iron chromium oxide, $FeCr_2O_4$), clay (e.g., any suitable clay, such as ball clay), corundum (e.g., a crystalline form of aluminium oxide ($Al_2O_3$) that can include traces of iron, titanium and chromium), diamond (e.g., a metastable allotrope of carbon, where the carbon atoms are arranged in a variation of the face-centered cubic crystal structure), diatomite (e.g., diatomaceous earth), feldspar (e.g., a tectosillicate mineral that can have a composition defined by an endmember that is at least one of potassium-feldspar ($KAlSi_3O_8$), albite endmember $NaAlSi_3O_8$, and anorthite $CaAl_2Si_2O_8$)), nepheline (e.g., a silica-undersaturated aluminosilicate, including $Na_3KAl_4Si_4O_{16}$), syenite (e.g., a course-grained igneous rock having a composition similar to granite (e.g., including quartz, mica, and feldspar), but with the quartz phase absent or present in smaller amounts, e.g., less than 5 wt %), fluorspar (e.g., a halide mineral including calcium fluoride, $CaF_2$), fuller's earth (e.g., sedimentary clays or clay-like earthy material that can be highly plastic, and can include calcium bentonite or attapulgite), garnet (e.g., species such as pyrope, almandine, spessartine, grossular, uvarovite, and andradite), gem minerals, granite (e.g., including quartz, mica, and feldspar), graphite (e.g., crystalline flake graphite, amorphous graphite, or lump graphite), gypsum (e.g., a soft sulfate mineral composed of calcium sulfate dihydrate, with the chemical formula $CaSO_4.2H_2O$), kaolin (e.g., rocks that are rich in kaolinite ($Al_2Si_2O_5(OH)_4$)), kyanite (e.g., is a silicate mineral that can be blue, commonly found in aluminium-rich metamorphic pegmatites and/or sedimentary rock, and can have the formula $Al_2SiO_5$), sillimanite (e.g., an alumino-silicate mineral with the chemical formula $Al_2SiO_5$), andalusite (e.g., an aluminium nesosilicate mineral with the chemical formula $Al_2SiO_5$), limestone (e.g., a sedimentary rock that can include calcite and aragonite, which are different crystal forms of calcium carbonate), dolomite (e.g., a carbonate mineral composed of calcium magnesium carbonate $CaMg(CO_3)_2$), mica (e.g., biotite, lepidolite, muscovite, phlogopite, zinnwaldite, and can have the chemical formula $(K,Na,Ca,Ba,Rb,Cs)_2(Al,Mg,Fe,Mn,Cr,Ti,Li)_{4-6}(Si,Al,Fe,Ti)_8O_{20}(OH,F)_4$), olivine (e.g., a magnesium iron silicate that having the formula $(Mg,Fe)_2SiO_4$), perlite (e.g., an amorphous volcanic glass that has a relatively high water content, typically formed by the hydration of obsidian, that can expand when heated sufficiently), phosphate minerals (e.g., minerals including phosphate ions), potash-potassium minerals (e.g., minerals including potassium in water-soluble form, such as KCl or $K_2CO_3$), pumice (e.g., a volcanic rock including vesicular rough textured volcanic glass. It can be, for example, silicic or felsic to intermediate in composition (e.g., rhyolitic, dactic, andesite, panterllerite, phonolie, trachyte), or basaltic), quartz (e.g., includes a continuous framework of $SiO_4$ silicon-oxygen tetrahedral, with each oxygen being shared between two tetrahedra, and having an overall formula of $SiO_2$), salt (e.g., NaCl), slate (e.g., a fine-grained, foliated, homogeneous metamorphic rock derived from an original shale-type sedimentary rock composed of clay or volcanic ash through low-grade regional metamorphism, and can include quartz, muscovite, illite, as well as biotite, chlorite, hematite, and pyrite), silica (e.g., silica sand, having the formula $SiO_2$, optionally including a network of Si—O—Si bonds), tripoli (e.g., rottenstone, can be used as an abrasive, includes silica and can include limestone), trona (trisodium hydrogendicarbonate dihydrate ($Na_3HCO_3CO_3.2H_2O$), from which soda ash can be derived ($Na_2CO_3$)), nahcolite (e.g., sodium bicarbonate ($NaHCO_3$)), mirabilite (sodium sulfate decahydrate ($Na_2SO_4.10H_2O$)), sodium sulfate (e.g., $Na_2SO_4$), staurolite (e.g., a red brown to black, mostly opaque, nesosilicate mineral that can have white streaks, having the formula $Fe^{2+}{}_2Al_9O_6(SiO_4)_4(O, OH)_2$), sulfur (e.g., elemental sulfur; sulfide minerals such as pyrite (iron sulfide), cinnabar (mercury sulfide), galena (lead sulfide), sphalerite (zinc sulfide) and stibnite (antimony sulfide); or sulfates minerals, such as gypsum (calcium sulfate), alunite (potassium aluminium sulfate), and barite (barium sulfate)), talc (e.g., a mineral including hydrated magnesium silicate with the chemical formula $H_2Mg_3(SiO_3)_4$ or $Mg_3Si_4O_{10}(OH)_2$), vermiculite (e.g., a hydrous, silicate mineral that is classified as a phyllo silicate and that expands greatly when heated), wollastonite (e.g., a calcium inosilicate mineral ($CaSiO_3$) that can include small amounts of iron, magnesium, and manganese substituting for calcium), calcium carbonate (e.g., $CaCO_3$), akaogiite (monoclinic form of $TiO_2$), rutile (e.g., tetragonal form of $TiO_2$), brookite (e.g., orthorhombic form of $TiO_2$), anatase (e.g., tetragonal form of $TiO_2$), and zeolite (e.g., microporous, aluminosilicate minerals commonly used as commercial adsorbents). In some embodiments, the one or more minerals include at least one limestone, clay (e.g., ball clay), sand (e.g., industrial quartz sand), gravel, diatomite, kaolin, bentonite, silica, barite, gypsum, chromite, calcium carbonate, anatase, rutile, and talc.

Gem minerals can include, for example, at least one of agate, alexandrite and other varieties of chrysoberyl, andalusite, axinite, benitoite, aquamarine and other varieties of beryl, bixbite, cassiterite, chrysocolla, chrysoprase, clinohumite, iolite, danburite, diamond, diopside, dioptase, dumortierite, emerald, feldspar (e.g., amazonite, labradoritem, moonstone, sunstone), garnet (e.g., hessonite), hambergite, hematite, jade (e.g. jadeite, nephrite), jasper, kornerupine, kunzite, lapis lazuli, malachite, opal, peridot, prehnite, pyrite, quartz and its varieties (e.g., agate, amethyst, citrine, chalcedony, onyx, tiger's-eye), rhodocrosite, ruby, sapphire, spinel, sugilite, tanzanite and other varieties of zoisite, topaz, turquoise, tourmaline, variscite, vesuvianite, zeolite (e.g., thomsonite), and zircon.

The industrial minerals in the mineral composition can include any suitable weight percentage of any one or any combination of industrial minerals described herein, such as about 0.000,000,01 wt % to 100 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt %. The mineral composition can be any suitable proportion of the aqueous slurry. For example, the mineral composition can be about 0.001 wt % to about 60 wt % of the aqueous slurry, or about 0.1 wt % to about 30 wt % of the aqueous slurry, or about 0.001 wt % or less, or about 0.01 wt %, 0.1, 1, 2, 3, 4, 5, 10, 15, 20, 25, 30, 35, 40, 45, 50, 55, or about 60 wt % or more of the aqueous slurry.

The one or more impurities in the mineral composition can be any suitable impurities, such as any impurity that can be found in industrial minerals or industrial mineral ore. For example, the one or more impurities can be at least one of cadmium, lead, arsenic, mercury, iridium, osmium, palladium, platinum, rhodium, ruthenium, chromium, molybdenum, nickel, vanadium, copper, silver, gold, tin, arsenic, antimony, selenium, zinc, iron, zirconium, niobium, iridium, bismuth, gallium, germanium, indium, uranium, manganese, an ion thereof (e.g., an ion of any member of the group), a radical thereof (e.g., a radical of any member of the group), an oxide thereof (e.g., an oxide of any member of the group), and a compound thereof (e.g., a compound including any member of the group). In some embodiments, the one or more impurities include at least one of cadmium, lead, arsenic, mercury, osmium, chromium, copper, tin, arsenic, selenium, iron, uranium, antimony, zinc, manganese, an ion thereof, a radical thereof, an oxide thereof, and a compound thereof. In some embodiments, the one or more impurities include at least one of Fe, $Fe^{2+}$, $Fe^{3+}$, $Fe(OH)_2$, $Fe(OH)_3$, $FeO_2$, and $FeO_3$, a salt of $Fe^{2+}$, a salt of $Fe^{3+}$, and a compound thereof (e.g., a compound including any member of the group).

The one or more impurities can form any suitable proportion of the mineral composition. For example, the one or more impurities can be about 0.000,001 wt % to about 40 wt % of the mineral composition, or about 0.000,001 wt % to about 10 wt % of the mineral composition, or about 0.000,001 wt % or less, or about 0.000,01 wt %, 0.000,1, 0.001, 0.01, 0.1, 1, 2, 3, 4, 5, 10, 15, 20, 25, 30, 35, or about 40 wt % or more. The one or more impurities can form any suitable proportion of the aqueous slurry. For example, the one or more impurities can be about 0.000,000.1 wt % to about 40 wt % of the aqueous slurry, or about 0.000,1 wt % to about 10 wt % of the aqueous slurry, or about 0.000,000,1 wt % or less, or about 0.000,001 wt %, 0.000,01, 0.000,1, 0.001, 0.01, 0.1, 1, 2, 3, 4, 5, 10, 15, 20, 25, 30, 35, or about 40 wt % or more.

In some embodiments, the aqueous composition can include suitable amounts of one or more additional components, such as a component present in the material that was processed to generate the mineral composition in the aqueous slurry, a component present in the water used to make the slurry, or a component added to the aqueous slurry. In some embodiments, about 0.000,000,01 wt % to 50 wt % of the aqueous slurry can be the one or more additional components, 0.000,1-40 wt %, 0.1 wt % to 30 wt %, or about 1-25 wt %, or about 0.000,000.01 wt % or less, or about 0.000,001 wt %, 0.000,1, 0.001, 0.01, 0.1, 1, 2, 3, 4, 5, 10, 15, 20, 30, 40, 50 wt % or more of the aqueous slurry can be the one or more additional components. For example, the aqueous slurry can include saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, fly ash, metakaolin, shale, zeolite, a crystalline silica compound, amorphous silica, fibers, a hydratable clay, microspheres, pozzolan lime, or a combination thereof.

System or Apparatus.

In various embodiments, the present invention provides a system. The system can be any suitable system that can perform an embodiment of the method of separating impurities from industrial minerals using electrocoagulation as described herein. In some embodiments, the system can include an aqueous slurry including a mineral composition including one or more minerals and one or more impurities. The system can include an electrocoagulator configured to subject the aqueous slurry to an electrical current to form at least one coagulation including the one or more impurities. The system can include a settling tank configured to settle one of at least one coagulation and at least some of the one or more minerals away from one another, to provide a purified mineral composition.

In various embodiments, the present invention provides an apparatus. The apparatus can be any suitable apparatus that can perform an embodiment of the method of separating impurities from industrial mineral using electrocoagulation as described herein. For example, the apparatus can include an electrocoagulator configured to subject an aqueous slurry including a mineral composition including one or more industrial minerals and one or more impurities to an electrical current to form at least one coagulation including the one or more impurities. The apparatus can include a settling tank configured to settle one of at least one coagulation and at least some of the one or more minerals away from one another, to provide a purified mineral composition.

FIG. 1 illustrates a system or apparatus 100, in accordance with various embodiments. The system or apparatus 100 includes an aqueous slurry 105 including a mineral composition including one or more minerals 110 and one or more impurities 115. The system or apparatus 100 can include an electrocoagulator 120 configured to subject the aqueous slurry 105 to an electrical current between electrodes 125 to form at least one coagulation 130 including the one or more impurities. The system or apparatus 100 can include a settling tank 135 configured to settle one least one coagulation 130 away from at least some of the one or more minerals 110, to provide a purified mineral composition 140. The settling tank 135 can allow settling of the one or more minerals 110, or of the one or more coagulations 130, as described herein.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of purifying an industrial mineral composition, the method comprising: obtaining or providing an aqueous slurry comprising a mineral composition, the mineral composition comprising one or more industrial minerals and one or more impurities; subjecting the aqueous slurry to an electrical current to form at least one coagulation comprising the one or more impurities; and separating at least one of the coagulations from the one or more minerals to provide a purified mineral composition.

Embodiment 2 provides the method of Embodiment 1, wherein the current comprises about 0.000,001 amps to about 1,000,000 amps.

Embodiment 3 provides the method of any one of Embodiments 1-2, wherein the current comprises about 0.001 amps to about 100,000 amps.

Embodiment 4 provides the method of any one of Embodiments 1-3, wherein the current comprises about 0.000,000,01 amps/cm$^2$ to about 10,000 amps/cm$^2$.

Embodiment 5 provides the method of any one of Embodiments 1-4, wherein the current comprises about 0.000,001 amps/cm$^2$ to about 1,000 amps/cm$^2$.

Embodiment 6 provides the method of any one of Embodiments 1-5, wherein the current comprises about 0.000,000,000,01 amps/min per cm$^3$ of aqueous slurry to about 1,000,000 amps/min per cm$^3$ of aqueous slurry.

Embodiment 7 provides the method of any one of Embodiments 1-6, wherein the current comprises about 0.000,000,001 amps/min per cm$^3$ of aqueous slurry to about 10,000 amps/min per cm$^3$ of aqueous slurry.

Embodiment 8 provides the method of any one of Embodiments 1-7, wherein the method comprises passing the aqueous slurry through multiple electrocoagulation units targeting one or more impurities.

Embodiment 9 provides the method of any one of Embodiments 1-8, wherein the current is generated in an electrocoagulation unit comprising the aqueous slurry.

Embodiment 10 provides the method of Embodiment 9, wherein the aqueous slurry continuously flows through the electrocoagulation unit.

Embodiment 11 provides the method of Embodiment 10, wherein the flow rate of the aqueous slurry is about 0.1 gallons per minute to about 10,000,000 gallons per minute.

Embodiment 12 provides the method of any one of Embodiments 9-11, wherein the aqueous slurry flows through the electrocoagulation unit in batches.

Embodiment 13 provides the method of any one of Embodiments 1-12, wherein the current comprises a direct current.

Embodiment 14 provides the method of any one of Embodiments 1-13, wherein the current comprises an alternating current.

Embodiment 15 provides the method of any one of Embodiments 1-14, wherein the current is generated between at least two electrodes.

Embodiment 16 provides the method of Embodiment 15, wherein the current generated between the at least two electrodes comprises about 0.000,000,01 amps/cm$^2$ to about 10,000 amps/cm$^2$.

Embodiment 17 provides the method of any one of Embodiments 15-16, wherein the current generated between the at least two electrodes comprises about 0.000,001 amps/cm$^2$ to about 1,000 amps/cm$^2$.

Embodiment 18 provides the method of any one of Embodiments 15-17, wherein the voltage between the at least two electrodes is about 0.000,001 volts to about 10,000,000 volts.

Embodiment 19 provides the method of any one of Embodiments 15-18, wherein the voltage between the at least two electrodes is about 0.000,1 volts to about 100,000 volts.

Embodiment 20 provides the method of any one of Embodiments 15-19, wherein the distance between the at least two electrodes is about 0.1 cm to about 100 cm.

Embodiment 21 provides the method of any one of Embodiments 15-20, wherein the distance between the at least two electrodes is about 1 cm to about 10 cm.

Embodiment 22 provides the method of any one of Embodiments 15-21, wherein the electrodes independently comprise at least one of a plate, a sphere, a cylinder, and a tube.

Embodiment 23 provides the method of any one of Embodiments 15-22, wherein at least one of the electrodes is perforated.

Embodiment 24 provides the method of any one of Embodiments 15-23, wherein each electrode comprises a plate.

Embodiment 25 provides the method of any one of Embodiments 15-24, wherein the electrodes independently comprise at least one of iron, aluminum, steel, graphite, copper, molybdenum, and titanium.

Embodiment 26 provides the method of any one of Embodiments 15-25, wherein the electrodes comprise at least one sacrificial electrode.

Embodiment 27 provides the method of any one of Embodiments 15-26, wherein the electrodes comprise at least one anode that generates a coagulant comprising at least one of $Al^{3+}$, $Fe^{2+}$, and $Fe^{3+}$.

Embodiment 28 provides the method of any one of Embodiments 15-27, wherein the electrodes comprise at least one cathode that generates a coagulant comprising at least one of $^-OH$ and $O_2^-$.

Embodiment 29 provides the method of any one of Embodiments 1-28, wherein the coagulation comprises a floc, a precipitate, or a combination thereof of at least one of the one or more impurities, one or more salts of the one or more impurities, and one or more compounds comprising the one or more impurities.

Embodiment 30 provides the method of Embodiment 29, wherein the salt of the one or more impurities or the compound comprising the one or more impurities comprises a coagulant.

Embodiment 31 provides the method of any one of Embodiments 29-30, wherein the salt of the one or more impurities comprises a salt comprising at least one of $Al^{3+}$, $Fe^{2+}$, $Fe^{3+}$, $^-OH$.

Embodiment 32 provides the method of any one of Embodiments 1-31, wherein the coagulation comprises a coagulant comprising the one or more impurities, wherein the one or more impurities are absorbed into or adsorbed onto the coagulant in the form of the one or more impurities, a salt of the one of more impurities, and a compound comprising the one or more impurities.

Embodiment 33 provides the method of any one of Embodiments 1-32, wherein the aqueous slurry comprises a coagulant.

Embodiment 34 provides the method of any one of Embodiments 1-33, wherein the coagulant at least one of: absorbs or adsorbs the one or more impurities in the form of the one or more impurities, a salt of the one or more impurities, and a compound comprising the one or more impurities; forms a salt with the one or more impurities; and forms a compound comprising the one or more impurities.

Embodiment 35 provides the method of any one of Embodiments 1-34, further comprising adding a coagulant to the aqueous slurry.

Embodiment 36 provides the method of any one of Embodiments 1-35, further comprising generating a coagulant in the aqueous slurry.

Embodiment 37 provides the method of any one of Embodiments 1-36, wherein the current is generated between at least two electrodes, wherein at least one of the electrodes generates a coagulant in the aqueous slurry during generation of the current.

Embodiment 38 provides the method of Embodiment 37, wherein the coagulant is $Al^{3+}$, $Fe^{3+}$, $^-OH$, .OH (OH radical), or $O_2^-$.

Embodiment 39 provides the method of any one of Embodiments 1-38, wherein the current is generated between at least two electrodes, wherein a coagulant is formed by combination of materials generated by electrolytic reactions at each electrode.

Embodiment 40 provides the method of Embodiment 39, wherein the coagulant comprises at least one of $Fe(OH)_3$, $Fe(OH)_2$, and $Al(OH)_3$.

Embodiment 41 provides the method of any one of Embodiments 1-40, further comprising placing the aqueous slurry in a settling area at least one of during or after the application of the current.

Embodiment 42 provides the method of Embodiment 41, wherein the settling area comprises a tank.

Embodiment 43 provides the method of any one of Embodiments 1-42, wherein separating at least one coagulation comprises allowing at least one coagulation to settle.

Embodiment 44 provides the method of any one of Embodiments 1-43, wherein separating at least one of the coagulations comprises skimming at least part of the purified one or more minerals away from above at least some of the one or more coagulations.

Embodiment 45 provides the method of any one of Embodiments 1-44, wherein separating at least one of the coagulations comprises allowing at least part of the purified one or more minerals to settle below at least some of the one or more coagulations.

Embodiment 46 provides the method of any one of Embodiments 1-45, wherein separating at least one of the coagulations comprises skimming at least some of the one or more coagulations away from above the purified one or more minerals.

Embodiment 47 provides the method of any one of Embodiments 1-46, wherein the mineral composition is about 0.001 wt % to about 60 wt % of the aqueous slurry.

Embodiment 48 provides the method of any one of Embodiments 1-47, wherein the mineral composition is about 0.1 wt % to about 30 wt % of the aqueous slurry.

Embodiment 49 provides the method of any one of Embodiments 1-48, wherein the one or more minerals comprise at least one of an aggregate, akaogiite, alunite, anatase, asbestos, barite, bentonite, borate, brookite, calcium carbonate, carbonatite, clay, chromite, corundum, diamond, diatomite, feldspar, nepheline, syenite, fluorspar, fuller's earth, garnet, gem minerals, granite, graphite, gypsum, kaolin, kyanite, sillimanite, andalusite, limestone, dolomite, marble, mica, olivine, perlite, phosphate, potash-potassium minerals, pumice, quartz, rutile, salt, slate, silica, tripoli, trona, sodium sulfate, nahcolite, mirabilite, staurolite, sulfur, talc, vermiculite, wollastonite, and zeolite.

Embodiment 50 provides the method of any one of Embodiments 1-49, wherein the one or more minerals comprise at least one limestone, clay, sand, gravel, diatomite, kaolin, bentonite, silica, barite, gypsum, chromite, calcium carbonate, rutile, anatase, and talc.

Embodiment 51 provides the method of any one of Embodiments 1-50, wherein the mineral composition comprises a particle size of less than about 0.001 mm to about 1 cm.

Embodiment 52 provides the method of any one of Embodiments 1-51, wherein the mineral composition comprises a pulverized material comprising the one or more minerals and the one or more impurities.

Embodiment 53 provides the method of any one of Embodiments 1-52, further comprising pulverizing an industrial mineral ore to form the mineral composition.

Embodiment 54 provides the method of any one of Embodiments 1-53, further comprising adding the mineral composition to an aqueous solution to form the aqueous slurry.

Embodiment 55 provides the method of Embodiment 54, wherein the aqueous solution comprises at least one of water, brine, seawater, brackish water, flowback water, and produced water.

Embodiment 56 provides the method of any one of Embodiments 1-55, wherein the one or more impurities comprise at least one of cadmium, lead, arsenic, mercury, iridium, osmium, palladium, platinum, rhodium, ruthenium, chromium, molybdenum, nickel, vanadium, copper, silver, gold, tin, arsenic, antimony, selenium, zinc, iron, zirconium, niobium, iridium, bismuth, gallium, germanium, indium, uranium, manganese, an ion thereof, a radical thereof, an oxide thereof, and a compound thereof.

Embodiment 57 provides the method of any one of Embodiments 1-56, wherein the one or more impurities comprise at least one of cadmium, lead, arsenic, mercury, osmium, chromium, copper, tin, arsenic, selenium, iron, uranium, antimony, zinc, manganese, an ion thereof, a radical thereof, an oxide thereof, and a compound thereof.

Embodiment 58 provides the method of any one of Embodiments 1-57, wherein the one or more impurities comprise at least one of Fe, $Fe^{2+}$, $Fe^{3+}$, a salt of $Fe^{2+}$, a salt of $Fe^{3+}$, $Fe(OH)_2$, $Fe(OH)_3$, $FeO_2$, and $FeO_3$, and a compound thereof.

Embodiment 59 provides the method of any one of Embodiments 1-58, wherein the one or more impurities are about 0.000,001 wt % to about 40 wt % of the mineral composition.

Embodiment 60 provides the method of any one of Embodiments 1-59, wherein the one or more impurities are about 0.001 wt % to about 10 wt % of the mineral composition.

Embodiment 61 provides the method of any one of Embodiments 1-60, wherein the one or more impurities are about 0.000,000,1 wt % to about 40 wt % of the aqueous slurry.

Embodiment 62 provides the method of any one of Embodiments 1-61, wherein the one or more impurities are about 0.000,1 wt % to about 10 wt % of the aqueous slurry.

Embodiment 63 provides the method of any one of Embodiments 1-62, wherein the separating of the one or more coagulations provides separated coagulations, wherein the separated coagulations comprise about 0.001 wt % to about 100 wt % of the one or more impurities from the mineral composition.

Embodiment 64 provides the method of Embodiment 63, wherein the separated coagulations comprise about 50 wt % to about 100 wt % of the one or more impurities from the mineral composition.

Embodiment 65 provides the method of any one of Embodiments 1-64, wherein the aqueous slurry further comprises saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, fly ash, metakaolin, shale, zeolite, a crystalline silica compound, amorphous silica, fibers, a hydratable clay, microspheres, pozzolan lime, or a combination thereof.

Embodiment 66 provides a method of purifying an industrial mineral composition, the method comprising: obtaining or providing an aqueous slurry comprising a mineral composition, the mineral composition comprising one or more industrial minerals and one or more impurities, the one or more industrial minerals comprising at least one of limestone, clay, sand, gravel, diatomite, kaolin, bentonite, silica, barite, gypsum, chromite, calcium carbonate, rutile, anatase, and talc, and the one or more impurities comprising at least one of cadmium, lead, arsenic, mercury, iridium, osmium, palladium, platinum, rhodium, ruthenium, chromium, molybdenum, nickel, vanadium, copper, silver, gold, tin, arsenic, antimony, selenium, zinc, iron, zirconium, niobium, iridium, bismuth, gallium, germanium, indium, uranium, manganese, an ion thereof, a radical thereof, an oxide thereof, and a compound thereof; subjecting the aqueous slurry to an electrical current to form at least one coagulation comprising the one or more impurities; and separating at least one of the coagulations from the one or more minerals, the separating comprising allowing at least one of the coagulations and at least one of the one or more minerals to settle away from one another, thereby providing a purified mineral composition.

Embodiment 67 provides a system comprising: an aqueous slurry comprising a mineral composition comprising one or more minerals and one or more impurities; an electrocoagulator configured to subject the aqueous slurry to an electrical current to form at least one coagulation comprising the one or more impurities; and a settling tank configured to settle at least one of the coagulations and at least one of the one or more minerals away from one another, to provide a purified mineral composition.

Embodiment 68 provides an apparatus for purifying industrial minerals, comprising: an electrocoagulator configured to subject an aqueous slurry comprising a mineral composition, the mineral composition comprising one or more industrial minerals and one or more impurities, to an electrical current to form at least one coagulation comprising the one or more impurities; and a settling tank configured to settle at least one of the coagulations and at least one of the one or more minerals away from one another, to provide a purified mineral composition.

Embodiment 69 provides the apparatus or method of any one or any combination of Embodiments 1-68 optionally configured such that all elements or options recited are available to use or select from.

What is claimed is:

1. A method of purifying an industrial mineral composition, the method comprising:
   obtaining or providing an aqueous slurry comprising a mineral composition, the mineral composition comprising one or more industrial minerals and one or more impurities, the one or more industrial minerals comprising at least one of akaogiite alunite, anatase, asbestos, barite, bentonite, borate, brookite, calcium carbonate, carbonatite, chromite, corundum, diamond, diatomite, feldspar, nepheline, syenite, fluorspar, fuller's earth, garnet, gem minerals, granite, graphite, gypsum, kaolin, kyanite, sillimanite, andalusite, limestone, dolomite, marble, mica, olivine, perlite, phosphate, potash-potassium minerals, pumice, quartz, rutile, salt, slate, silica, tripoli, trona, sodium sulfate, nahcolite, mirabilite, staurolite, sulfur, talc, vermiculite, wollastonite, and zeolite:
   subjecting the aqueous slurry to an electrical current to form at least one coagulation comprising the one or more impurities; and
   separating at least one of the coagulations from the one or more minerals to provide a purified mineral composition.

2. The method of claim 1, wherein the current is generated in an electrocoagulation unit comprising the aqueous slurry.

3. The method of claim 1, wherein the coagulation comprises a floc, a precipitate, or a combination thereof of at least one of the one or more impurities, one or more salts of the one or more impurities, and one or more compounds comprising the one or more impurities.

4. The method of claim 1, wherein the coagulation comprises a coagulant comprising the one or more impurities, wherein the one or more impurities are absorbed into or adsorbed onto the coagulant in the form of the one or more impurities, a salt of the one of more impurities; and a compound comprising the one or more impurities.

5. The method of claim 1, wherein the aqueous slurry comprises a coagulant.

6. The method of claim 1, further comprising placing the aqueous slurry in a settling area at least one of during or after the application of the current.

7. The method of claim 1, wherein separating at least one coagulation comprises allowing at least one coagulation to settle.

8. The method of claim 1, wherein separating at least one of the coagulations comprises skimming at least part of the purified one or more minerals away from above at least some of the one or more coagulations.

9. The method of claim 1, wherein separating at least one of the coagulations comprises allowing at least part of the purified one or more minerals to settle below at least some of the one or more coagulations.

10. The method of claim 1, wherein separating at least one of the coagulations comprises skimming at least some of the one or more coagulations away from above the purified one or more minerals.

11. The method of claim 1, wherein the mineral composition comprises a pulverized material comprising the one or more minerals and the one or more impurities.

12. The method of claim 1, further comprising adding the mineral composition to an aqueous solution to form the aqueous slurry.

13. The method of claim 1, wherein the one or more impurities comprise at least one of cadmium, lead, arsenic, mercury, iridium, osmium, palladium, platinum, rhodium, ruthenium, chromium, molybdenum, nickel, vanadium, copper, silver, gold, tin, arsenic, antimony, selenium, zinc, iron, zirconium, niobium, iridium, bismuth, gallium, germanium, indium, uranium, manganese, an ion thereof, a radical thereof, an oxide thereof, and a compound thereof.

14. The method of claim 1, wherein the one or more impurities are about 0.000,001 wt % to about 40 wt % of the mineral composition.

15. The method of claim 1, wherein the one or more impurities are about 0.000,000.1 wt % to about 40 wt % of the aqueous slurry.

16. The method of claim 1, wherein the separating of the one or more coagulations provides separated coagulations, wherein the separated coagulations comprise about 0.001 wt % to about 100 wt % of the one or more impurities from the mineral composition.

17. The method of claim 1, wherein the one or more impurities comprise at least one of Fe, $Fe^{2+}$, $Fe^{3+}$, a salt of $Fe^{2+}$, a salt of $Fe^{3+}$, $Fe(OH)_2$, $Fe(OH)_3$, $FeO_2$, and $FeO_3$, and a compound thereof.

18. A method of purifying an industrial mineral composition, the method comprising:
   obtaining or providing an aqueous slurry comprising a mineral composition, the mineral composition comprising one or more industrial minerals and one or more impurities, the one or more industrial minerals comprising at least one of akaogite, alunite, anatase, asbestos, barite, bentonite, borate, brookite, calcium carbonate, carbonatite, chromite, corundum, diamond, diatomite, feldspar, nepheline, syenite, fluorspar, fuller's earth, garnet, gem minerals, granite, graphite, gypsum, kaolin, kyanite, sillimanite, andalusite, limestone, dolomite, marble, mica, olivine, perlite, phosphate, potash-potassium minerals, pumice, quartz, rutile, salt, slate, silica, tripoli, trona, sodium sulfate, nahcolite, mirabilite, staurolite, sulfur, talc, vermiculite, wollastonite, and zeolite and the one or more impurities comprising at least one of cadmium, lead, arsenic, mercury, iridium, osmium, palladium, platinum, rhodium, ruthenium, chromium, molybdenum, vanadium, copper, silver, gold, tin, arsenic, antimony, selenium, zinc, iron, zirconium, niobium, iridium, bismuth, gallium, germanium, indium, uranium, manganese, an ion thereof a radical thereof, an oxide thereof, and a compound thereof;
   subjecting the aqueous slurry to an electrical current to form at least one coagulation comprising the one or more impurities; and
   separating at least one of the coagulations from the one or more industrial minerals, the separating comprising allowing at least one of the coagulations and at least one of the one or more minerals to settle away from one another, thereby providing a purified mineral composition.

19. The method of claim 16, wherein the one or more impurities comprise at least one of Fe, $Fe^{2+}$, $Fe^{3+}$, a salt of $Fe^{2+}$, a salt of $Fe^{3+}$, $Fe(OH)_2$, $Fe(OH)_3$, $FeO_2$, and $FeO_3$, and a compound thereof.

* * * * *